United States Patent [19]

Moan

[11] Patent Number: 5,633,540
[45] Date of Patent: May 27, 1997

[54] SURGE-RESISTANT RELAY SWITCHING CIRCUIT

[75] Inventor: James M. Moan, Allentown, Pa.

[73] Assignee: Lutron Electronics Co., Inc., Coopersburg, Pa.

[21] Appl. No.: 673,666

[22] Filed: Jun. 25, 1996

[51] Int. Cl.$^6$ .................................................. H02H 7/22
[52] U.S. Cl. .................. 307/126; 307/125; 307/139; 307/140; 361/2; 361/3; 361/8; 361/13; 361/166; 361/191
[58] Field of Search .................................. 307/126, 125, 307/139, 140; 361/8, 2, 3, 13, 166, 191

[56] References Cited

U.S. PATENT DOCUMENTS

| | | |
|---|---|---|
| Re. 29,172 | 4/1977 | Lutz . |
| 2,675,505 | 4/1954 | Flurscheim et al. . |
| 2,748,226 | 5/1956 | MacNeill et al. . |
| 3,223,888 | 12/1965 | Koppelmann . |
| 3,237,030 | 2/1966 | Coburn . |
| 3,249,810 | 5/1966 | Strom et al. . |
| 3,284,648 | 11/1966 | Koppelmann . |
| 3,321,668 | 5/1967 | Baker . |
| 3,395,316 | 7/1968 | Denes et al. . |
| 3,402,324 | 9/1968 | Kesseling et al. . |
| 3,491,315 | 1/1970 | Kesseling et al. ............ 200/148 |
| 3,558,910 | 1/1971 | Dale .............................. 307/136 |
| 3,636,292 | 1/1972 | Roth ............................. 200/144 B |
| 3,639,808 | 2/1972 | Ritzow .......................... 317/1 FL |
| 3,864,604 | 2/1975 | Pfanzelt ......................... 317/11 A |
| 3,868,549 | 2/1975 | Schaefer et al. ............... 317/11 E |
| 3,982,137 | 9/1976 | Penrod .......................... 361/8 |
| 4,025,820 | 5/1977 | Penrod .......................... 317/11 |
| 4,074,333 | 2/1978 | Murakami et al. ............. 361/13 |
| 4,152,634 | 5/1979 | Penrod .......................... 361/8 |
| 4,209,814 | 6/1980 | Garzon ........................... 361/5 |
| 4,236,101 | 11/1980 | Luchaco ........................ 315/149 |
| 4,251,845 | 2/1981 | Hancock ........................ 361/8 |
| 4,346,419 | 8/1982 | Janniello ....................... 361/2 |
| 4,349,748 | 9/1982 | Goldstein et al. ............. 307/132 |
| 4,389,691 | 6/1983 | Hancock ....................... 361/8 |
| 4,392,171 | 7/1983 | Kornrumpf ................... 361/5 |
| 4,709,188 | 11/1987 | Roberts ........................ 315/178 |

(List continued on next page.)

FOREIGN PATENT DOCUMENTS

| | | |
|---|---|---|
| 0062004 | 10/1982 | European Pat. Off. . |
| 0482680 | 4/1992 | European Pat. Off. . |
| 4124794 | 1/1993 | Germany . |

OTHER PUBLICATIONS

Co–Pending Patent Application No. 08/407,696.
Co–Pending Patent Application No. 08/585,111.
Co–Pending Patent Application No. 08/—Infrared Light Transmissive Member and Radiation Receiver, Filed Sep., 1996.

*Primary Examiner*—William M. Shoop, Jr.
*Assistant Examiner*—Albert W. Paladini
*Attorney, Agent, or Firm*—Ostrolenk, Faber, Gerb & Soffen, LLP

[57] ABSTRACT

In a relay switching panel, a switching circuit operates to selectively connect and disconnect resistive, capacitive and inductive loads to an AC power source with substantially no arcing. The switching circuit comprises a pair of relays, preferably connected in parallel, with one of such relays having a triac, connected in series therewith. With the relays open, an air gap isolates the power source and the load. In closing the relays in sequence, one relay provides a conductive path from the power source to the triac. After a suitable delay to allow the relay contacts to stabilize in the closed position, the triac is triggered to provide a conductive path from the power source to the load, and a large current surge flows to the load. After the current surge has subsided, the second relay is closed to provide a direct conductive path between the power source and the load. Next the first relay and the triac are removed from the circuit to ensure full conduction through the second relay. Another sequence of opening and closing the relays and the triac in a particular order can be employed to provide substantially arcless switching during turn off. As a result of this arrangement, the switching circuit is low cost, compact and reliable over an extended period of time.

26 Claims, 6 Drawing Sheets

U.S. PATENT DOCUMENTS

| | | | |
|---|---|---|---|
| 4,727,296 | 2/1988 | Zaharchuk et al. | 315/295 |
| 4,772,809 | 9/1988 | Koga et al. | 307/140 |
| 4,788,415 | 11/1988 | Whipple | 219/508 |
| 4,855,612 | 8/1989 | Koga et al. | 307/140 |
| 4,885,654 | 12/1989 | Budyko et al. | 361/13 |
| 4,889,999 | 12/1989 | Rowen | 307/31 |
| 5,107,184 | 4/1992 | Hu et al. | 307/31 |
| 5,191,265 | 3/1993 | D'Aleo et al. | 315/295 |
| 5,283,706 | 2/1994 | Lillemo et al. | 361/3 |
| 5,404,080 | 4/1995 | Quazi | 315/151 |
| 5,451,843 | 9/1995 | Kahn et al. | 315/186 |

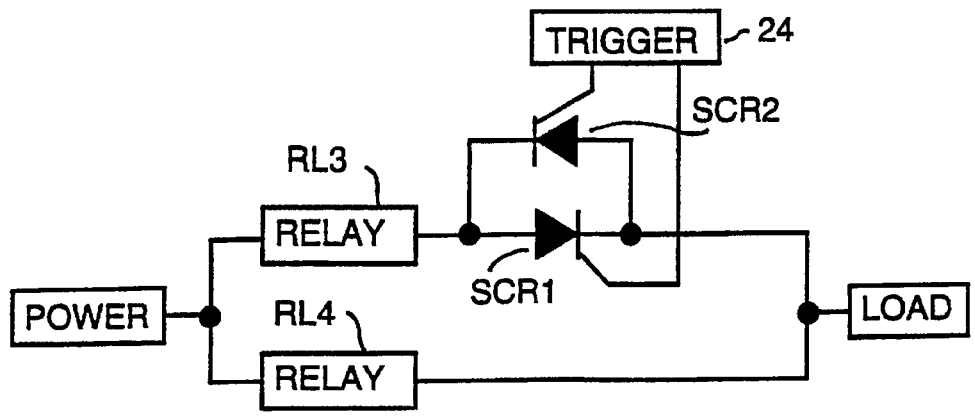
FIG. 4
(PRIOR ART)
FIG. 5
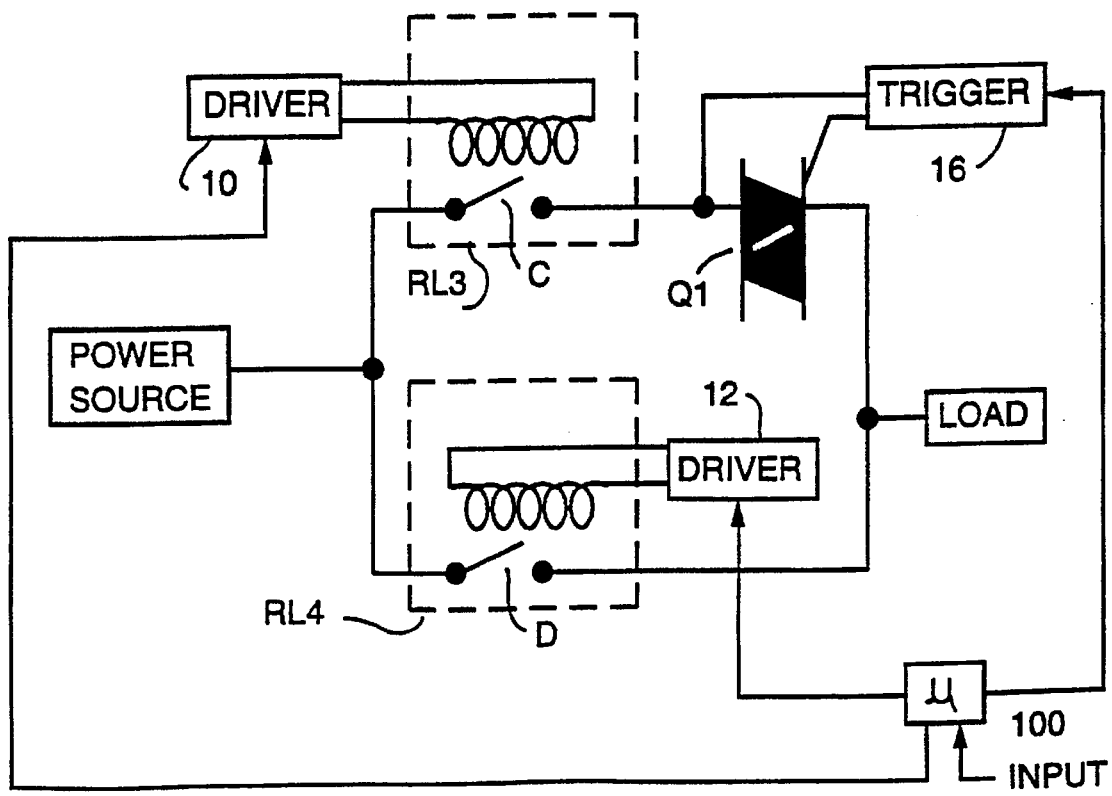

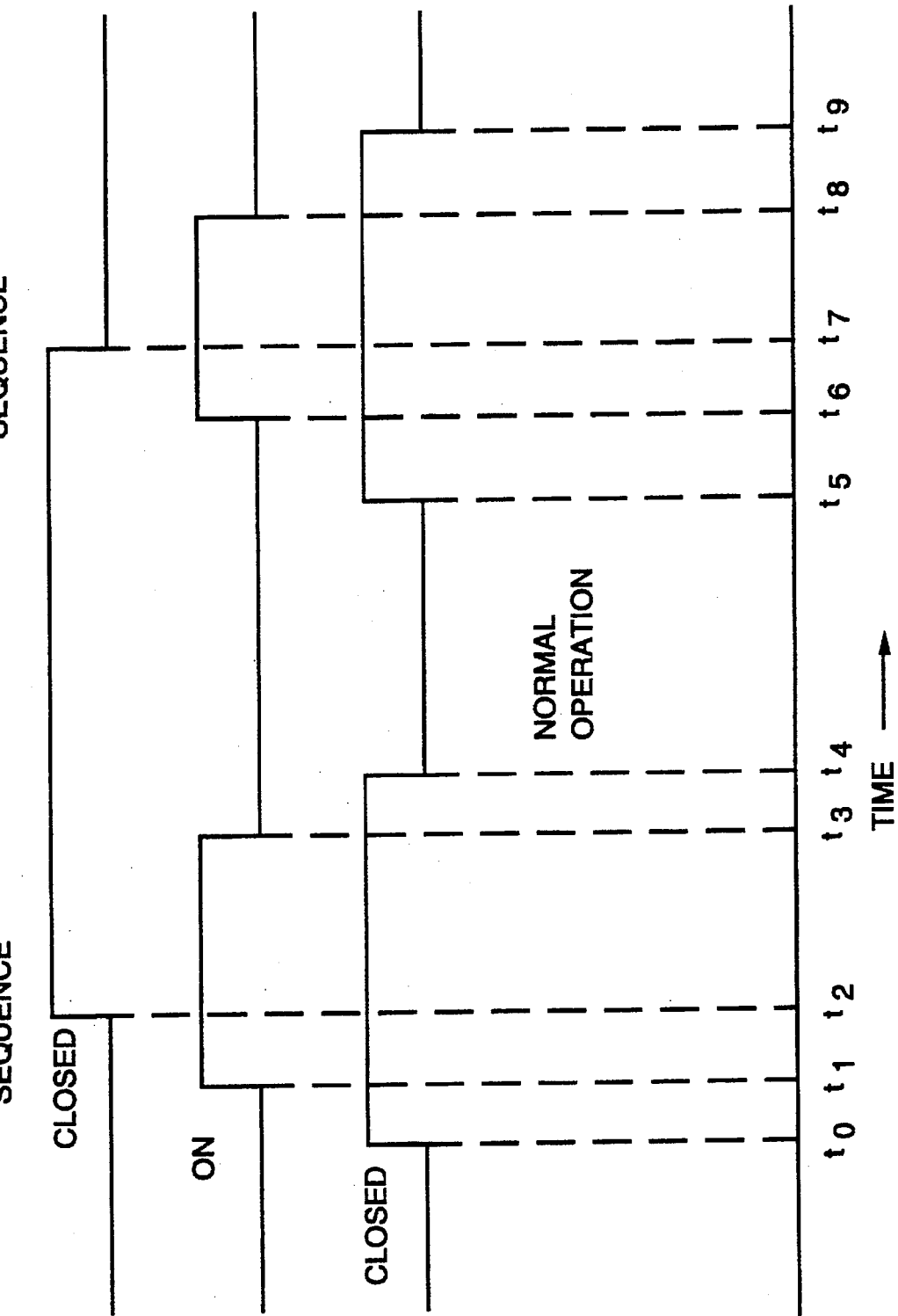

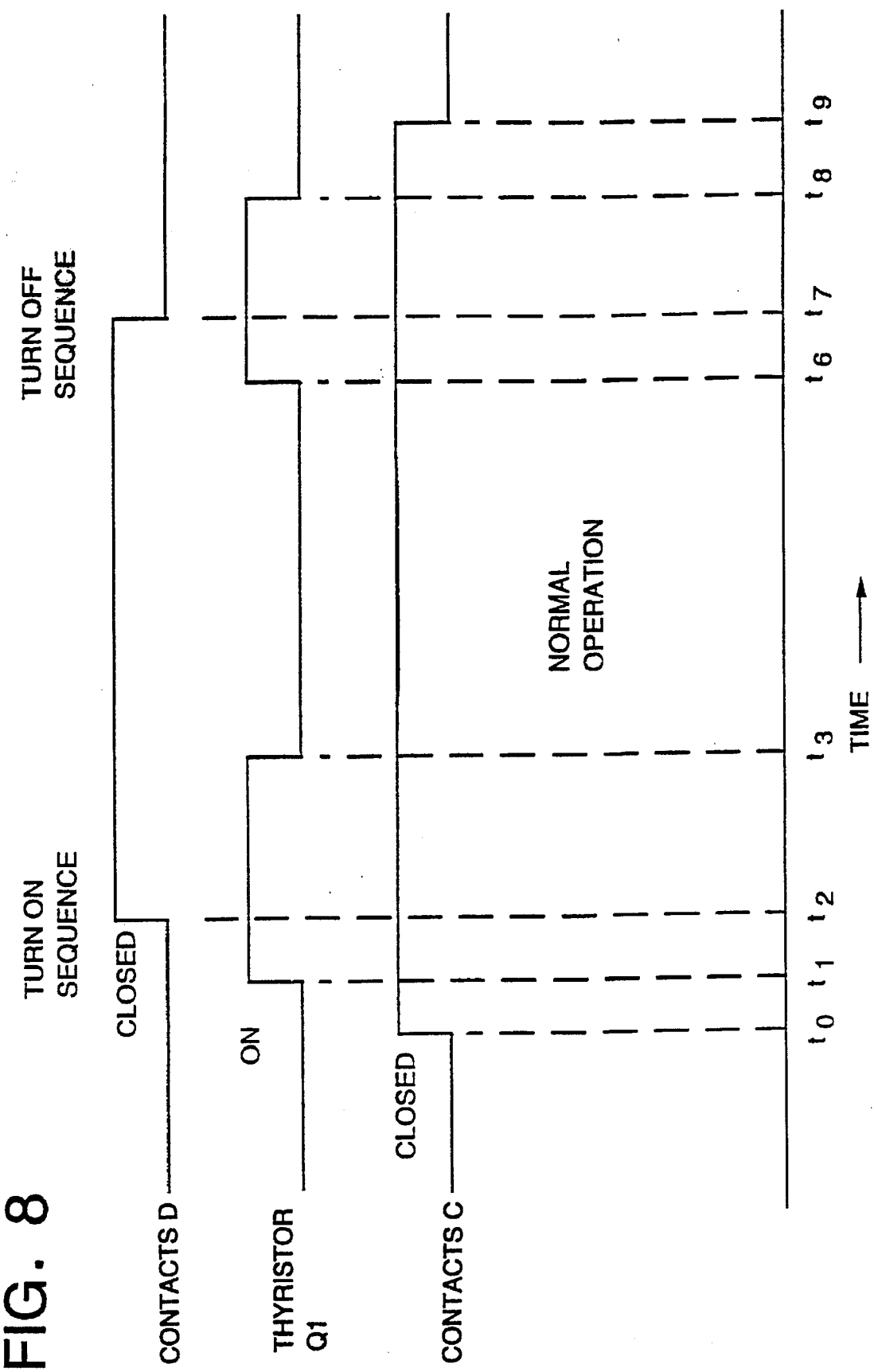

SURGE-RESISTANT RELAY SWITCHING CIRCUIT

FIELD OF THE INVENTION

This invention relates to improvements in switching circuits for loads, including, for example, inductive loads, such as motor loads and magnetic low voltage transformers.

BACKGROUND OF THE INVENTION

Relays for connection and disconnection of inductive, capacitive and resistive loads, and their combinations are well known. Such relays are disclosed in U.S. Pat. No. 5,309,068, entitled TWO RELAY SWITCHING CIRCUIT FOR FLUORESCENT LIGHTING CONTROLLER, in the name of Simo P. Hakkarainen et al, and assigned to the assignee of the present invention; and are also described in U.S. Pat. No. 4,855,612, U.S. Pat. No. 4,772,809, U.S. Pat. No. 4,209,814 and U.S. Pat. No. 3,864,604.

In the prior art, it was known to employ a main switching relay contact with a parallel circuit consisting of a controllably conductive device such as a triac, a pair of antiparallel connected SCRs, a MOSFET, an IGBT or a thyristor type device in series with an auxiliary switching relay contact. In operation, and during closing, the auxiliary relay contact is first closed, and the thyristor is next turned on, creating a conductive path in parallel to the main relay contact. The main contact is then closed with little or no arcing.

In U.S. Pat. No. 5,309,068, the series path containing the auxiliary relay contact and thyristor was then made nonconductive until the next main relay contact closing operation. The main load circuit is opened simply by opening the main contact.

In U.S. Pat. No. 4,772,809, to close the circuit, the series circuit of auxiliary relay contact and thyristor is first made conductive and the main relay contact is closed without arcing. However, the auxiliary relay contact remains closed so that, when opening the load circuit, the main contact is opened, and current can commutate into the closed series circuit. Thus, the main relay contact opens with little or no arcing.

It has been found that circuits of this type, in which the auxiliary relay contact remains closed while the main relay contact is closed, are subject to damage or destruction due to surge currents created, for example, by a lightning strike since the extremely high surge current, which is partly diverted into the closed series circuit, can be sufficiently high to damage or destroy the thyristor. However, capacitive inrush current during closing of the main relay contact on a capacitive load can damage the main contact if it is closed too soon after the closing of the series circuit. If, however, the delay in closing the main switch is too long, the total energy applied to the triac will cause it to heat to the point where it requires a heat sink.

These requirements are interrelated and have created numerous problems in the design of these circuits.

SUMMARY OF THE INVENTION

In accordance with the present invention, a novel switching circuit with a novel operating sequence is provided to enhance the arcless switching of inductive, resistive and capacitive loads while protecting the series circuit thyristor from excessive surge currents and heating.

More specifically, the present invention provides a novel power switching circuit in which a main relay switch is connected in parallel with a series circuit containing an auxiliary relay switch and a thyristor or other controllably conductive device. Both the main relay switch and auxiliary relay switch are open when the power switching circuit is open to provide a positive air gap in the circuit when it is off.

An operating sequence is provided to prevent current surge damage to the thyristor or other semiconductor device by ensuring that the auxiliary contact is opened as soon as possible after the closing of the main contact. Thus, high surge currents cannot be diverted into the series circuit when the load circuit is connected to the source by the main relay.

A novel operating sequence is provided which has a time delay between the conducting or closing of the controllably conductive device and closing of the main contact of from 70 to 135 milliseconds, preferably about 100 milliseconds for a lamp ballast load. This delay will ensure that the capacitive surge current which can occur during closing will have dissipated before the main relay contact is closed, while the current through the thyristor flows for a time sufficiently short to prevent excessive heating of the thyristor.

Capacitive loads cause substantial arcing during the closing of the contacts of a relay circuit because the difference in voltage between the power source and the load is so large that the current surges into the capacitor to charge it up upon contact closure. This current surge contains enough energy to arc across the bouncing relay contacts.

Inductive loads cause substantially more arcing during the opening sequence because the energy stored in the inductive magnetic fields forces an arc current through the small gap separating the relay contacts as they open.

The invention and its various advantages will be better understood from the ensuing detailed description of preferred embodiments, reference being made to the accompanying drawings wherein like reference characters designate like parts.

BRIEF DESCRIPTION OF THE DRAWING(S)

FIGS. 3 and 4 are block diagrams of prior art embodiments of a switching circuit;

FIG. 5 is a block diagram of the switching circuit of the invention;

FIG. 7 is a timing diagram similar to that of FIG. 6 but showing the timing of the closing and opening of the switching devices of FIG. 5 in accordance with the invention.

FIG. 8 is a timing diagram similar to that of FIG. 7 but showing the timing of the closing and opening of the switching devices of FIG. 5a in accordance with the invention.

DETAILED DESCRIPTION OF PREFERRED EMBODIMENTS

In applying power to loads such as an electronic ballast of the type used to control the operation of a fluorescent lamp, one finds that the ballast behaves as a capacitive load. Thus, each time power is applied to the load, for example, by closing a switch between the load and a line voltage source, there is an in-rush of current to the load which quickly subsides as the load charges up to line voltage. This 10 temporary current surge is a function of the number of electronic ballasts controlled by a single relay switch. For example, in the case of a full 16 ampere (steady-state) circuit of dimming ballasts, the current surge can approach 300 amperes. Though short-lived, perhaps only a few cycles, this level of surge can damage the contacts of even a relatively large relay having a high (e.g. 50 amp) current rating. The problem stems from the fact that each time a pair of relay contacts close or snap together, there is a tendency for them to bounce apart. When this bouncing occurs during a large current surge, the intervening gas or air ionizes and arcing occurs. Arcing also occurs during the opening sequence with an inductive load as previously described. The arcing has the effect of locally heating the conductive coatings on the relay contacts which eventually causes the relay to fail, either due to erosion of the contact material, or, more commonly, due to welding of the contacts in the closed position.

Figure 1:
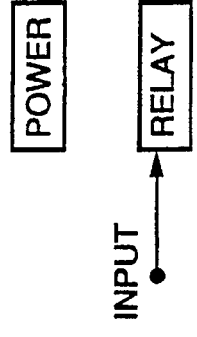
FIGS. 1 and 2 are electrical schematics of prior art switching circuits.

Single heavy-duty relays having large contacts and a high spring constant have been used. But relays of this type tend to be both costly and bulky in size. A less costly approach uses two relatively small relays connected in parallel, with one having a current-limiting resistive element in series therewith. Such a switching circuit is shown in FIG. 1. In operation, relay RL1 is closed for a short time while relay RL2 remains open. As relay RL1 closes, surge current from the power source flows through the resistor R to charge up the capacitive load. The amplitude of the current surge is limited by the resistor R, depending on its value. After the current surge has abated, the second relay RL2 is closed to provide a direct and substantially impedance-free path between the source and load. Obviously, the resistor R in this circuit must be appropriately rated to repeatedly tolerate the current surge without damage or breakdown. Such a resistor tends to be relatively large in size, and even compared to some active circuit elements, it is expensive. But more serious problems in adopting the circuit of FIG. 1 are: (1) some arcing will still occur between the relay contacts as they bounce upon initial closure since there is a conductive path through the resistor just as soon as the first relay is closed; and (2) the resistor R is repeatedly subjected to high energy stress levels since the voltage across the resistor R can approach full line voltage, if only for a short time, each time the first relay RL1 is closed. This means the first relay is still subjected to some surge current while still bouncing, and the resistor R must dissipate the energy it absorbs as heat, either internally or via a heat sink. While this circuit may handle capacitive loads, it is unusable for inductive loads.

Figure 2:
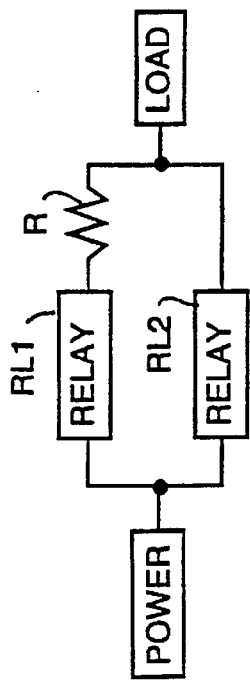

Hybrid switching circuits have been proposed to avoid these problems. These circuits use a relay of the type having two sets of contacts, and a semiconductor switch, such as a triac, as shown in FIG. 2. This circuit operates as follows. When an input signal is applied to the relay, contacts A close first, thereby causing current to immediately flow through resistor R to the gate lead of triac Q. Upon triggering the triac, current flows from the power source to the load, through the triac. After a predetermined time period, the B contacts close, allowing load current to flow unimpeded from the source to the load. At this point, both sets of relay contacts are closed. When the input signal is removed, the B contacts open first, thereby causing load current to again flow in the triac Q. Subsequently, when contacts A open, the load current becomes zero and is cut off by the triac Q.

There are at least three potential problems in using a circuit of the type shown in FIG. 2 to control power switching to an electronic ballast. First, since the triac Q is always driven ON, even when the B contacts are closed, it is possible for load current to flow continuously in the triac Q, rather than only for the short time interval between the closure of the two sets of contacts. During the initial conduction interval, the triac will reduce the voltage across the still open B contacts to about 1 volt (i.e., the On state voltage of the triac). This low voltage may not be enough to rupture any oxide coating on the second set of contacts; thus, while the B contacts may be mechanically "closed", they may not be "closed" in an electrical sense. This problem also exists in the circuits of prior art U.S. Pat. Nos. 4,855,612 and 4,772,809. The net result will be that all the load current will continue to flow in the triac Q which, since it is not heat sunk, will rapidly overheat and ultimately fail. Since the typical failure mode is a "short", the relay will then be unable to open the load current.

A second potential problem with the FIG. 2 circuit is that, when the relay is turned OFF, the parallel contacts (i.e., the B contacts) open first, so that the load current is again picked up by the triac Q momentarily. Later, the drive is removed from the triac Q gate when the A contacts finally open. At this point, the triac Q is supposed to commutate OFF, thereby removing power from the load circuit. But certain types of load circuits, particularly those with highly inductive characteristics, can prevent the triac Q from commutating to the OFF state, thereby leaving the load energized when it is supposed to be OFF. This is a safety issue. Note, there is no airgap OFF in the FIG. 2 circuit.

A third potential problem with the FIG. 2 circuit is that since there is no airgap, small amounts of leakage current from the triac Q1 can charge up capacitive loads such as electronic ballasts, resulting in a voltage large enough to be harmful. This is a serious safety issue because the load would appear to be off to a volt meter at a certain time, but, at a later time, the load voltage could be large enough to be harmful.

Figure 3:
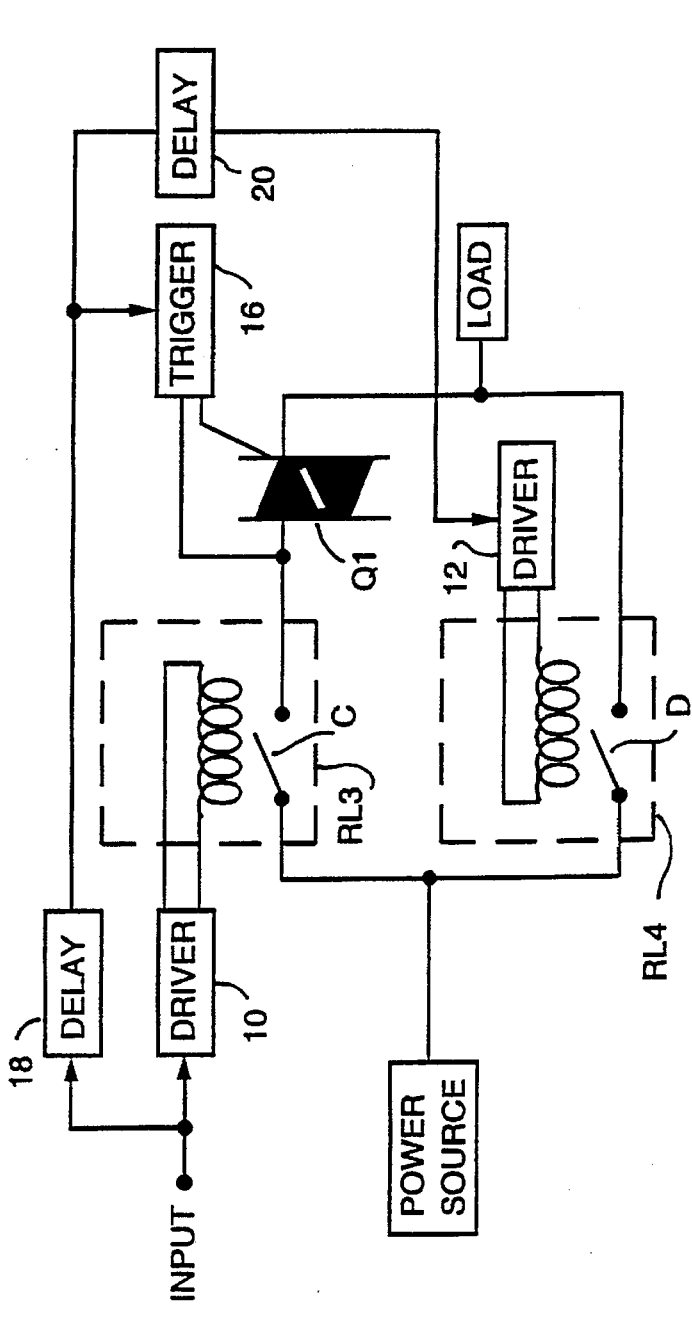

Referring now to FIG. 3, a prior art power switching circuit (of U.S. Pat. No. 5,309,068) is illustrated as comprising a pair of switches, such as discrete relays RL3 and RL4, and a controllably conductive device, such as an electronic switch, and most preferably a triac Q1. While the preferred embodiment utilizes two discrete relays, it will be appreciated that a single relay having two sets of contacts and some means for controlling the relative times at which the contacts close and open could also be used, as in the case of the FIG. 2 switching circuit. Relays RL3 and RL4 are driven by driver circuits 10 and 12, respectively, which produce signals which cause the respective relay contacts to open and close. The operation of triac Q1 is controlled by a trigger circuit 16 which, at an appropriate time, produces an output on the triac's gate lead, thereby causing the triac Q1 to conduct. The FIG. 3 circuit in the prior art operated as follows:

First, an input is provided to driver circuit 10, thereby causing it to close the contacts C of relay RL3, and allowing current to pass from the power source to the triac Q1. In closing the relay, the contacts will unavoidably "bounce" for a few milliseconds. But since the triac Q1 is turned OFF and is designed to block the current during this bounce time, there can be no arcing between the relay contacts as a result of this closure. After a suitable delay (e.g., 10 to 50 msec., and preferably about 25 msec.) sufficient to allow the relay contacts to stabilize in the closed position, the triac is triggered into conduction, and current surges to the load. This delay is provided by a suitable RC delay circuit 18 which is coupled to the input to relay RL3. Since the contacts of relay RL3 are now closed tight, no arcing occurs as a result of any current surge to the load. After a suitable time period to allow the current surge to abate, e.g., 20 to 100 msec. and preferably about 75 msec., the contacts of relay RL4 are closed to provide an impedance-free conduction path from the power source to the load. This delay is provided by a second RC delay circuit 20 which is triggered by the output of circuit 18. At this time, the triac is turned OFF, and relay RL3 is opened to remove the triac from the circuit. By this sequence, the triac need not be heat sunk to dissipate the heat of the steady-state current to the load. To disconnect the load from the power source, relay RL4 is eventually opened.

The switching circuit of FIG. 3 is advantageous from the following standpoints: (1) It is safe, particularly from the standpoint that an air gap is provided between the load and power source even in the event the triac should fail by shorting out. Note, in the FIG. 2 circuit, failure of the triac results in a direct short between the load and power source. (2) It is highly reliable from the standpoint that the triac only "sees" the load current between the time the triac is fired and the time the second relay (RL4) is closed. (3) there can be no arcing between the relay contacts since the triac is triggered only after the contact "bouncing" has subsided. (4) By virtue of the delay circuits 18 and 20 it is readily adapted for use with different types of relays and triacs. (5) Compared to the circuit of FIG. 1, it can be manufactured at lower cost and be made of more compact size. This circuit, however, cannot handle inductive loads.

Referring now to prior art FIG. 4, a variation of the FIG. 3 switching circuit is shown to comprise a pair of silicon-controlled rectifiers, SCR-1 and SCR-2, connected in parallel. In combination, these semiconductor switching elements provide substantially the same function as triac Q1 in the FIG. 3 circuit. Their operation is controlled by a conventional trigger circuit 24.

THE INVENTION

The present invention is shown in FIG. 5 in which components similar to those of FIG. 3 have the same identifying numerals. It will be noted that the fixed delay circuits 18 and 20 have been removed (as compared to FIG. 3) and that their function is performed by a suitable microprocessor 100 or by suitable control devices which will control the switching of the electrically controllable switching devices RL3, RL4 and Q1, in accordance with the novel switching sequence of the invention. The prior art switching sequence of the circuit of FIG. 3 is shown in FIG. 6 in which the times $t_0$, $t_1$, and $t_2$ represent the closing of the contacts C of switch RL3, the turning on of triac Q1, and the closing of the contacts D of switch RL4, respectively. Thereafter, at time $t_3$, the contacts C of switch RL3 are opened and triac Q1 is turned off and the contact remains open and the triac remains off until the next closing sequence. In some prior art circuits, switches in the positions of RL3 and Q1 remain closed as long as contacts D of switch RL4 are closed (permitting possible damage to triac Q1 due to current surges on the line or overheating if the load current continues to flow through the controllably conductive device instead of flowing through the main relay, as discussed above).

FIG. 7 shows the novel operating sequence of the invention as controlled by microprocessor 100 in FIG. 5. In FIG. 7, it will be noted that the turn on sequence at times $t_0$ through $t_4$ is similar to that of the prior art FIGS. 3 and 6. A critical time delay of from 70 to 135 milliseconds is provided between the turning on of triac Q1 and the closing of contacts D of relay RL4 at times $t_1$ and $t_2$ respectively. This time is preferably 100 milliseconds and provides sufficient time to insure that capacitive current surges have dissipated before closing main contact D of relay RL4, while not permitting main thyristor current to flow so long that heat sinking would be necessary.

Significantly, a novel turn off sequence is employed in which, contacts C of relay RL3 close at time $t_5$, followed by the turn on/closing of thyristor Q1, at time $t_6$, followed by the opening of main contact D at $t_7$. Thereafter thyristor Q1 is turned off/opened at $t_8$ and contacts C of relay RL3 is opened at $t_9$. The entire circuit then isolates the load and the power source by open contacts.

Figure 5A:
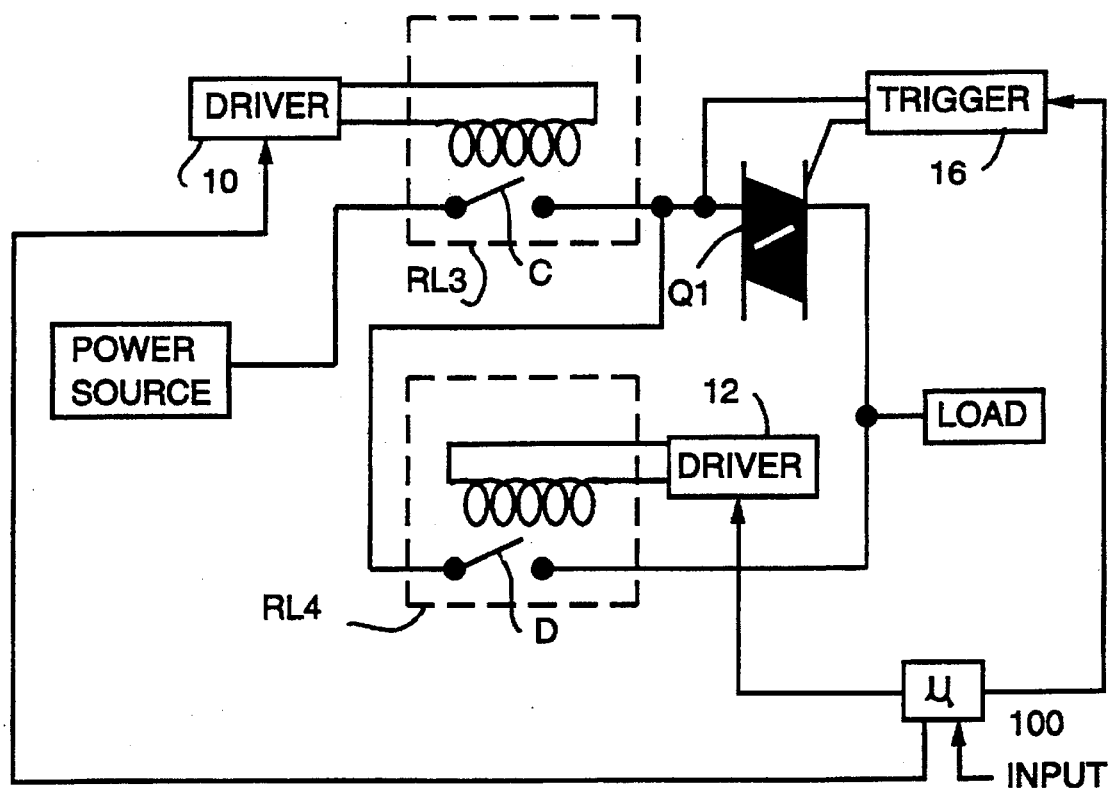
FIG. 5a shows an alternative embodiment of the switching circuit of the invention.
Figure 6:
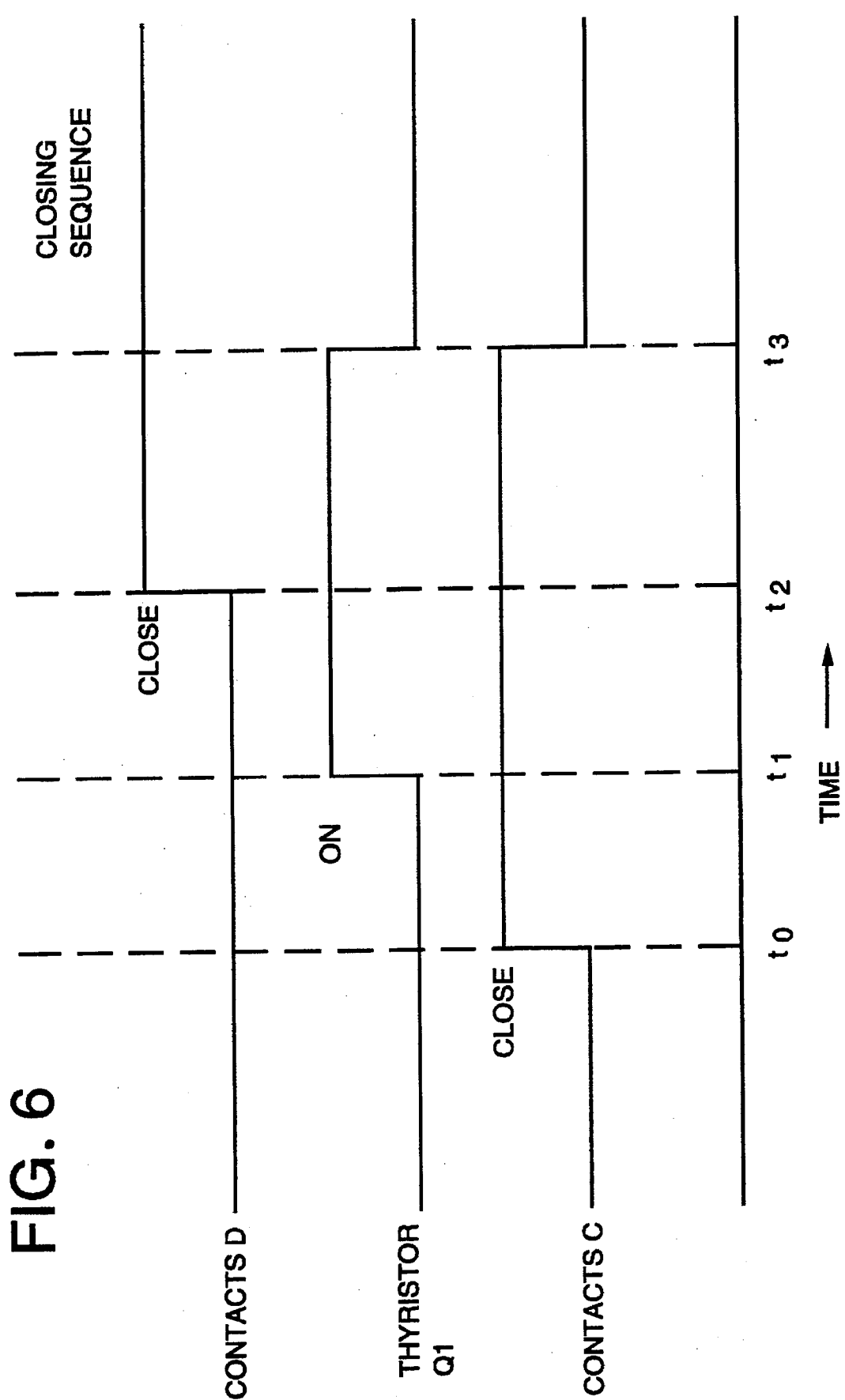
FIG. 6 is a timing diagram showing the timing of the closing and opening of the switching devices of FIGS. 3 and 4 in the prior art.

Another embodiment of the present invention is shown in FIG. 5a. It is substantially the same as the circuit of FIG. 5, except electrically controllable switching device RL4 is only in parallel with triac Q1, and not the series combination of triac Q1 and relay RL3.

FIG. 8 shows the novel operating sequence for the circuit of FIG. 5a. It is substantially the same as the operating sequence for the circuit of FIG. 5 illustrated in the timing diagram of FIG. 7, except the contacts C of electrically controllable switching device RL3 remain closed during normal operation.

The embodiment of the invention illustrated in FIG. 5a has the disadvantage of having two relay contacts in the circuit in the on position but still provides the protective turn on and turn off sequence.

Significantly, the switching sequence of the invention permits the same power switching circuit to be used for any load including inductive, capacitive and resistive loads. Thus, the user need not be concerned about the nature of the load to be switched.

As a result of these modifications it is possible to employ less expensive and smaller relays and thyristors for the circuit of FIGS. 5 and 5a. Thus, main relay RL4 may be a SCHRACK RP 330F24. Auxiliary relay RL3 may be an OMRON G2R-1A-E-T130; and thyristor Q1 may be a triac made by SGS Thompson type BTA-24-400BWL.

As a further unexpected advantage of the invention, the substantial reduction in arcing at the relay contacts as they open and close causes a substantial reduction in radiated noise or RFI and EMI.

Although the preferred embodiment utilizes two relays and a triac to perform the novel switching sequence, any combination of switches, for example, a mechanical relay, a mechanical switch, an electrical relay, a triac, a pair of antiparallel SCR's, an IGBT, a FET, or a MOSFET would perform this novel switching function.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A switching circuit for switching power between a power source and a load, said switching circuit comprising:
    (a) first and second electrically controllable switches connected in series to electrically connect and disconnect said power source and said load;
    (b) a third electrically controllable switch connected in parallel with said series connected first and second electrically controllable switches;

(c) control means connected to said first, second and third switches; said control means being operable for sequentially closing said first, second and third switches in that order to connect said power source to said load;

(d) said control means being operable for thereafter opening said first and second switches and retaining said first and second switches open until an opening sequence is begun;

(e) said control means being further operable for reclosing said first switch and said second switch while said third switch remains closed to initiate an opening sequence;

(f) said control means being further operable for opening said third switch after reclosing said first and second switches during said opening sequence; and (g) thereafter reopening said first and second switches.

2. The apparatus as defined by claim 1 whereby said first switch is reclosed prior to said second switch.

3. The apparatus as defined by claim 1 whereby said second switch is reopened prior to said first switch.

4. The device of claim 1 wherein said third switch is closed only after a delay of from 70 to 135 milliseconds after the closing of said second switch.

5. The device of claim 4 wherein said third switch is closed only after a delay of about 100 milliseconds after the closing of said second switch.

6. The apparatus as defined by claim 1 wherein said first and third switches comprise electrical relays and said second switch comprises a controllable conductive device.

7. The apparatus as defined by claim 1 further comprising means for controlling the time interval between the sequential closings of said first and second switches.

8. The apparatus as defined by claim 1 further comprising means for controlling the time interval between the sequential closings of said second and third switches.

9. The apparatus as defined by claim 1 further comprising means for controlling the respective time intervals between the sequential closings of said first and second switches, and said second and third switches.

10. The circuit of claim 1 wherein said load comprises an inductive load.

11. The device of claim 7 wherein said third switch is closed after a delay of from 70 to 135 milliseconds after the closing of said second switch.

12. The device of claim 11 wherein said third switch is closed after a delay of about 100 milliseconds after the closing of said second switch.

13. A switching circuit for switching power between a power source and a load, said switching circuit comprising:

(a) first and second electrically controllable switches connected in series to electrically connect and disconnect said power source and said load;

(b) a third electrically controllable switch connected in parallel with said second electrically controllable switch;

(c) control means connected to said first, second and third switches; said control means being operable for sequentially closing said first, second and third switches in that order to connect said power source to said load;

(d) said control means being operable for thereafter opening said second switch and retaining said second switch open until an opening sequence is begun;

(e) said control means being further operable for reclosing said second switch while said first switch and said third switch remain closed to initiate an opening sequence;

(f) said control means being further operable for opening said third switch after reclosing said second switch during said opening sequence; and (g) thereafter reopening said first and second switches.

14. The apparatus of claim 13 wherein said load comprises an inductive load.

15. The apparatus of claim 13 wherein said first and third electrically controllable switches comprise electrical relays.

16. The apparatus of claim 13 wherein said second electrically controllable switch comprises a triac.

17. A method for switching power between a power source and a load, said method comprising the steps of:

(a) providing a switching circuit comprising a first switch and a controllably conductive device connected in series with one another and connected in series with said power source and said load, and a second switch connected in parallel with said series connected first switch and said controllably conductive device;

(b) connecting said power source to said load by closing said first switch and waiting for a first predetermined time period and after said first predetermined time period, rendering said controllably conductive device conductive and waiting for a second predetermined time period and thereafter closing said second switch; thereafter rendering said controllably conductive device nonconductive and opening said first switch until an opening sequence is begun;

(c) and disconnecting said power source from said load by reclosing said first switch device and rendering said controllably conductive device conductive again to initiate an opening sequence, and opening said second switch and then rendering said controllably conductive device nonconductive again and reopening said first switch.

18. The method of claim 17 wherein said second switch is closed after a delay of from 70 to 135 milliseconds after rendering said controllably conductive device conductive.

19. The method of claim 18 wherein said second switch is closed only after a delay of about 100 milliseconds after rendering said controllably conductive device conductive.

20. The method as defined by claim 17 wherein said first predetermined period is between about 15 and about 60 milliseconds, and wherein said second predetermined time period is between about 70 and about 135 milliseconds.

21. The method as defined by claim 20 wherein said first and second predetermined time periods are about 40 and about 100 milliseconds, respectively.

22. The method as defined by claim 17 wherein said first and second switches comprise electrical relays, each relay having electrical contacts which snap together when their associated switch is closed, and wherein said first time period is sufficient to allow the contacts of said first switch to stabilize together after said first switch is closed.

23. The method as defined by claim 22 wherein said second predetermined time period is sufficient to allow any current surge occurring after said controllably conductive device is rendered conductive to abate.

24. A method for disconnecting a load from a power source; said method comprising the steps of:

(a) providing a switching circuit comprising a first electrically controllable switch and a controllably conductive device in series with the load and a second electrically controllable switch in parallel with said first electrically controllable switch and said controllably conductive device; said second electrically controllable switch being in the closed state when said load is connected to said power source;

(b) disconnecting said power source from said load by closing said first electrically controllable switch and waiting for a predetermined period of time, and after said period of time rendering said controllably conductive device conductive and waiting for a second predetermined period of time; and thereafter opening said second electrically controllable switch, then rendering said controllably conductive device nonconductive and opening said first electrically controllable switch.

25. The method of claim 24 wherein said load comprises an inductive load.

26. The method of claim 24 wherein said first and second electrically controllable switches comprise electrical relays.

* * * * *